(12) United States Patent
Mason (10) Patent No.: US 11,879,052 B2
(45) Date of Patent: Jan. 23, 2024

(54) CURATIVES

(71) Applicant: HEXCEL COMPOSITES LIMITED, Duxford (GB)

(72) Inventor: Christopher Robert Mason, Newmarket (GB)

(73) Assignee: HEXCEL COMPOSITES LIMITED, Duxford (GB)

( * ) Notice: Subject to any disclaimer, the term of this patent is extended or adjusted under 35 U.S.C. 154(b) by 153 days.

(21) Appl. No.: 17/603,209

(22) PCT Filed: Apr. 17, 2020

(86) PCT No.: PCT/EP2020/060885
§ 371 (c)(1),
(2) Date: Oct. 12, 2021

(87) PCT Pub. No.: WO2020/216688
PCT Pub. Date: Oct. 29, 2020

(65) Prior Publication Data
US 2023/0167272 A1 Jun. 1, 2023

(30) Foreign Application Priority Data

Apr. 24, 2019 (GB) ..................................... 1905741

(51) Int. Cl.
*C08K 5/5313* (2006.01)
*C08K 5/3445* (2006.01)

(52) U.S. Cl.
CPC .......... *C08K 5/5313* (2013.01); *C08K 5/3445* (2013.01)

(58) Field of Classification Search
CPC ............................ C08K 5/3445; C08K 5/5313
See application file for complete search history.

(56) References Cited

U.S. PATENT DOCUMENTS

| | | | |
|---|---|---|---|
| 8,735,529 B2* | 5/2014 | Kaneko | C08G 59/68 562/480 |
| 10,344,132 B2* | 7/2019 | Misumi | C08G 59/5033 |
| 2010/0179250 A1 | 7/2010 | Kazuo et al. | |
| 2012/0088920 A1 | 4/2012 | Masami et al. | |

FOREIGN PATENT DOCUMENTS

| | | |
|---|---|---|
| CN | 102875470 A | 1/2013 |
| CN | 108291010 A | 7/2018 |
| CN | 109206600 A | 1/2019 |
| IN | 107099022 A | 8/2017 |
| TW | 576473 U | 2/2004 |
| WO | 2016/087935 A1 | 6/2016 |
| WO | 2017/061101 A1 | 4/2017 |

OTHER PUBLICATIONS (ISR) Faghihi, et al., "Synthesis and properties of novel flame-retardant and thermally stable ploy (amide-imed)s from N,N'," Macromolecular Research, vol. 17, No. 10, Oct. 1, 2009, pp. 739-745.
Search Report under Section 17(5), issued in a related Great Britain Application, Application No. GB1905741.3, dated Oct. 10, 2019.
International Search Report (ISR) and Written Opinion (WO), issued in the parent Patent Cooperation Treaty (PCT), Application No. PCT/EP2020/060885, dated Jun. 9, 2020.

* cited by examiner

*Primary Examiner* — Vickey Nerangis
(74) *Attorney, Agent, or Firm* — W. Mark Bielawski (57) ABSTRACT

The host compound in a clathrate is an amino or hydroxyl containing aromatic phosphorous compound, clathrates containing a resin curative and their use in curable resin compositions to produce moulded articles particularly fibre reinforced articles.

4 Claims, 1 Drawing Sheet

CURATIVES

BACKGROUND OF THE INVENTION

1. Field of the Invention

The present invention relates to clathrates and to their use as curatives for curable resin systems and also to resin system containing the clathrates and moulded articles produced therefrom. In particular the clathrates are used to provide latency of cure, rapid cure and flame retardant properties to resin systems and articles made therefrom.

In the present invention, the term "clathrate" refers to a compound in which two or more molecules are bound via a bond other than a covalent bond, typically hydrogen bonds and more generally, it refers to a crystalline compound as indicated by X-ray diffraction in which two or more molecules are bound via their molecular interaction. For Example in a clathrate formed between a host containing an oxygen or nitrogen containing group and a guest compound containing nitrogen such as an imidazoline, an oxygen containing group, the molecules may be bound by one of the hydrogens on the nitrogen forming a hydrogen bond with the oxygen functionality.

A component of the clathrate which includes is referred to as the host compound or the encapsulating material and the compound or compounds which is or are included in the host compound is referred to as the guest compound. The host compound and the guest compound form the clathrate compound or structure.

Clathrates are known materials and they have been proposed for use as resin curatives where the guest compound of the clathrate is at least one ingredient of the resin cure system. The use of such a clathrate can provide curative systems which provide a latent curing effect whereby the host element of the clathrate prevents the curative from reacting with the resin until the bond(s) between the host and the guest compound is broken so releasing the guest curative to react with the resin and thereby preventing or reducing premature curing of the resin to provide storage stability at ambient temperature known as outlife.

Instead of a single guest compound, two or more different guest compounds may be present in a clathrate. When the clathrate is to be used as a curative for curable resin systems the guest compounds are preferably amino based curatives such as imidazole compounds or imidazoline compounds. The guest compounds may also include accelerators or a combination of curatives and accelerators.

2. Description of Related Art

US 20120088920 discloses a curable resin composition using a clathrate component of an isophthalic acid-based host compound and an imidazole as guest compound in which the curing reaction is suppressed at low temperature. FIG. 21 of this document shows that these systems have cure times of several minutes. US 20100179250 is concerned with improving the storage stability and retaining the flowability of sealants based on epoxy resins when sealing and uses clathrates based on carboxylic acids and imidazole compounds and WO 2016/087935 also discloses the use of clathrates based on various carboxylic acids in combination with imidazole curatives together with dicyandiamide and at least one aromatic urea and the aromatic urea and the clathrate function as latent, heat activated cure accelerators for the epoxy resin with the urea reducing the initial onset temperature for cure and the clathrate reduces the final temperature of cure to result in a cure degree of at least 50% after heating at 163° C. for 5 minutes. Taiwanese patent 576473 B produces clathrates by recrystallisation.

Chinese Patent publication CN 107099022-A discloses latent flame retardant curing agents for epoxy resins comprising clathrates in which the host material is a phosphorous containing aromatic compound and the guest component is an imidazole. Chinese patent publication 108291010 discloses the use of various diamine diphenyl phosphinic acid materials as cocatalysts for the curing of epoxy resins to accelerate cure.

BRIEF SUMMARY OF THE INVENTION

We have now found that aromatic phosphorous containing amino or hydroxy groups may be used as host compounds in clathrates and that when used with particular guest compounds are useful latent curatives for thermocurable resins particularly to increase the speed of cure at the desired cure temperature, improve the glass transition temperature ($T_g$) as well as imparting flame retardancy to resin systems and articles made therefrom.

The invention therefore provides the use as the host compound in a clathrate of a compound of a general formula selected from and wherein X, $X_1$, $X_2$ and $X_3$ are independently selected from S or O and at least one of $Y_1$ and $Y_2$ is present and when both $Y_1$ and $Y_2$ are present they may be same or different and when they are present they are NHR or OH where R is selected from H, or a hydrocarbyl group.

The invention further provides a clathrate comprising a host compound and a guest compound in which the host compound is selected from compounds of general formula and wherein X, $X_1$, $X_2$ and $X_3$ are independently selected from S or O and at least one of $Y_1$ and $Y_2$ is present and when both $Y_1$ and $Y_2$ are present they may be the same or different and when they are present they are selected from NHR or OH where R is selected from H or a hydrocarbyl group.

In a further embodiment the invention provides such a clathrate in which the guest compound comprises at least one compound selected from the group consisting of (II)

in which $R_1$ represents a hydrogen atom, a $C_1$-$C_{10}$ alkyl group, an aryl group, an arylalkyl group, or a cyanoethyl group, and $R_2$ to $R_4$ each independently represent a hydrogen atom, a nitro group, a halogen atom, a $C_1$-$C_{20}$ alkyl group, a $C_1$-$C_{20}$ alkyl group substituted with a hydroxy group, an aryl group, an arylalkyl group, or a $C_1$-$C_{20}$ acyl group; and a part with a dashed line represents a single bond or a double bond, and diazabicycloalkanes (DBCA) such as [1,8-diazabicyclo[5.4.0]undecene-7,1,4-diazabicyclo[2.2.2] octane and 1,5-diazabicyclo[4.3.0]non-5-ene.]

In a further embodiment the invention provides the use as a curative for thermocurable resins of a clathrate comprising a host compound selected from compounds of general formula wherein X, $X_1$, $X_2$ and $X_3$ are independently selected from S or O and at least one of $Y_1$ and $Y_2$ is present and when both $Y_1$ and $Y_2$ are present they may be the same or different and when present they are selected from NHR or OH where R is selected from H, and the guest compound comprises a curative for a thermocurable resin.

In a further embodiment the invention provides a thermocurable resin composition comprising a thermocurable resin and a clathrate wherein the host compound of the clathrate is selected from compounds of the general formula wherein X, $X_1$, $X_2$ and $X_3$ are independently selected from S or O and at least one of $Y_1$ and $Y_2$ is present and when both are present they may be the same or different and when present they are selected from NHR or OH where R is selected from H, or a hydrocarbyl group and the guest compound of the clathrate is a curative for the thermocurable resin.

In a yet further embodiment the invention provides the use of such a thermocurable resin as the matrix in the production of fibre reinforced thermocurable resins.

In a further embodiment the invention provides a moulding material comprising a thermocurable material, a fibrous reinforcement and a curative comprising a clathrate in which the host compound of the clathrate is selected from compounds of the general formula wherein X, $X_1$, $X_2$ and $X_3$ are independently selected from S or O and at least one of $Y_1$ and $Y_2$ is present and when both are present they may be the same or different and when present they are selected from NHR or OH where R is selected from H, or a hydrocarbyl group and the guest compound is a curative for the thermocurable material.

It is a requirement of this invention that at least one of the aromatic groups is substituted with an NHR group or a hydroxyl group. One or both of the aromatic groups may however contain additional substituents such as alkyl groups, alkenyl groups, additional aromatic groups and further polar substituents including further amino and or hydroxyl groups.

In a further embodiment the invention provides an article produced by the curing of the curable material in a moulding material of this invention.

In the context of this invention, a curative is a compound which is adapted to initiate or advance a polymerisation reaction of a polymerisable resin. The term curative includes accelerators which are chemical compounds which enhance the polymerisation reaction (or "curing") and curative agents which are chemical compounds which initiate the polymerisation reaction of a polymerisable resin. The curative may include a curative agent, an accelerator or both of these compounds.

The clathrate of this invention preferably has a crystalline structure as can be determined by X-ray diffraction. The interactions between the host compound and the guest compound are preferably non-covalent bonds which enable the host and guest compounds to form a clathrate. The curative is released from the clathrate by a triggered release which may be chemical, physical or a combination of both.

The chemical release may comprise a release which affects the interactions between the host compound and the guest compound by chemically altering the composition of one or both of the compounds.

The physical release may comprise a release which affects the interactions between the host compound and the guest compound without chemically altering the composition of the each of the compounds. An example of a physical release is dissolution of the host component, an increase in temperature, a phase change of the host compound, dissolution or radiation.

We have found that clathrates based on a host compound comprising amino or hydroxy substituted aromatic groups linked by a phosphorous atom as a host compound containing a curative as a guest compound are particularly suitable for curing resins particularly in one component matrix systems. The use of such clathrates as curatives has been found to provide resin compositions having good control of rapid cure conditions over a short time together with a long time until onset of curing at ambient temperature (known as outlife) and provides cured resins of high glass transition temperature (Tg) with good Tg retention and improved fire retardancy.

Additionally we have found that the use of such a clathrate to provide a curing agent and/or a curing accelerator of thermoset resins, preferably epoxy resins, provides a curative having a selected temperature for the onset cure of and therefore allows long term storage of one-component resin matrix systems containing highly reactive curatives.

In an embodiment of the invention the mol ratio of the host compound to the guest compound in the clathrate of this invention is in the range of from 0.5 to 2, preferably 0.7 to 1.7, more preferably from 0.9 to 1.5 and more preferably from 0.95 to 1.4 or from 0.95 to 1.1 and/or combinations of these ratios.

The average particle size D50 of the clathrate as measured by laser diffraction (ASTM D4464) is, but not particularly limited to, in the range of about 0.01 to 100 μm, preferably in the range of about 0.1 to 100 μm, more preferably from 1 to 50 μm and even more preferably from 5 to 40 μm or from 10 to 30 μm and/or combinations of the aforesaid ranges.

The clathrate of this invention can be used as a curative in a resin composition to provide improved outlife whilst providing a cured resin having a desired glass transition temperature ($T_g$). The use of the clathrates of this invention has been found to increase the speed of cure.

The invention further provides a process for manufacturing a clathrate comprising the steps of providing a host compound comprising a compound selected from and a guest compound comprising a curative; mixing the host compound and the guest compound in an organic solvent, followed by refluxing the solution and extracting a precipitate containing the clathrate wherein X, $X_1$, $X_2$ and $X_3$ are independently selected from S or O and at least one of $Y_1$ and $Y_2$ is present and when both are present they may be the same or different and when present they are selected from NHR or OH where R is selected from H, or a hydrocarbyl group The organic solvent may be selected from methyl ethyl ketone (MEK), acetone, methanol, ethyl acetate, dicholoromethane or toluene.

In further embodiments of the inventions there are provided a resin composition comprising a curative composition according to this invention in combination with at least one resin component such as an epoxy, polyisocyante and a phenolic resin particularly an epoxy resin. The resin composition is preferably in the form of a one-component resin composition which does not require mixing of components shortly before its use. Such a resin composition includes all components necessary to complete curing of the composition without requiring additional mixing of other curative or accelerator components.

In another embodiment, there is provided a resin composition comprising a curative, a resin component and a clathrate according to the invention comprising a host compound wherein the guest compound is a cure accelerator to enhance the curing reaction of the curative. The composition preferably comprises an epoxy resin component, and the curative preferably comprises a hydrazide based curative such as adipic dihydrazide (ADH) or vinyl dihydrazide (VDH), and the guest component may be an imidazole or imidazoline based component which acts as an accelerator in combination with the hydrazide based curative such resin compositions may be used in a host of applications: composite materials, coatings, gel coats, adhesives and laminates.

The curable composition may comprise additional resin components, fillers, and/or impact modifiers. The composition may be used as a gel coat, adhesive, binder or filler.

In a further embodiment there is provided a moulding material comprising a fibrous reinforcement material and resin composition as herein described and articles made from such moulding materials.

The clathrates of this invention are particularly useful as curatives for epoxy resin and the epoxy component may be mono-functional or multifunctional, preferably at least difunctional. In an embodiment, the epoxy resin component (A) may be selected from various conventionally-known polyepoxy compounds. Examples thereof include: aromatic glycidyl ether compounds such as bis(4-hydroxyphenyl) propane diglycidyl ether, bis(4-hydroxy-3,5-dibromophenyl)propane diglycidyl ether, bis(4-hydroxyphenyl)ethane diglycidyl ether, bis(4-hydroxyphenyl)methane diglycidyl ether, resorcinol diglycidyl ether, phloroglucinol triglycidyl ether, trihydroxy biphenyl triglycidyl ether, tetraglycidyl benzophenone, bisresorcinol tetraglycidyl ether, tetramethyl bisphenol A diglycidyl ether, bisphenol C diglycidyl ether, bisphenol hexafluoropropane diglycidyl ether, 1,3-bis[1-(2,3-epoxypropoxy)-1-trifluoromethyl-2,2,2-trifluoroethyl] benzene, 1,4-bis[1-(2,3-epoxypropoxy)-1-trifluoromethyl-2,2,2-trifluoromethyl]benzene, 4,4'-bis(2,3-epoxypropoxy) octafluorobiphenyl, and phenolic novolac type bisepoxy compounds; alicyclic polyepoxy compounds such as alicyclic diepoxy acetal, alicyclic diepoxy adipate, alicyclic diepoxy carboxylate, and vinylcyclohexene dioxide; glycidyl ester compounds such as diglycidyl phthalate, diglycidyl tetrahydrophthalate, diglycidyl hexahydrophthalate, dimethylglycidyl phthalate, dimethylglycidyl hexahydrophthalate, diglycidyl-p-oxybenzoate, diglycidylcyclopentane-1,3-dicarboxylate, and dimer acid glycidyl ester; glycidyl amine compounds such as diglycidyl aniline, diglycidyl toluidine, triglycidyl aminophenol, tetraglycidyl diaminodiphenyl methane, and diglycidyl tribromoaniline; and heterocyclic epoxy compounds such as diglycidylhydantoin, glycidyl glycidoxyalkylhydantoin, and triglycidyl isocyanurate; and oligomer compounds thereof.

Examples of the liquid epoxy resin include polyalkylene ether type epoxy compounds such as (poly)ethylene glycol diglycidyl ether, (poly)propylene glycol diglycidyl ether, and trimethylolpropane triglycidyl ether; glycidyl ester type epoxy compounds such as dimer acid diglycidyl ester, phthalic acid diglycidyl ester, and tetrahydrophtalic acid diglycidyl ester; and homopolymers of glycidyl (meth) acrylate, allyl glycidyl ether and the like or copolymers of these monomers with other soft unsaturated monomers. In this context, soft unsaturated monomer refers to a monomer which contains a homopolymer which has a glass transition temperature of less than 60° C. Examples of soft unsaturated monomers include methyl acrylate, ethyl acrylate, butyl (meth)acrylate, isobutyl(meth)acrylate, 2-ethylhexyl(meth) acrylate, and lauryl methacrylate.

The host component of the clathrates of this invention may be of the formula wherein X, $X_1$, $X_2$ and $X_3$ are independently selected from sulphur or oxygen and $Y_1$ and $Y_2$ are as previously defined. It is preferred that in the compounds of formula both X and $X_1$ are oxygen whereby the compounds are substituted phosphinic acid material such as 4,4'-diamino diphenyl phosphinic acid, 4,4'-diamino-3,3',5,5'-[ . . . ] diphenyl phosphinic acid, 4,4'-diamino-3,3',5,5'-tetrabromo-diphenyl diphenyl phosphinic acid, 3,4'-diamino diphenyl phosphinic acid, 3,3'-diamino diphenyl phosphinic acid, 4,4'-diamino-2,2'-dimethyl diphenyl phosphinic acid, 4,4'-diamino-2,3'-dimethyl diphenyl phosphinic acid, 4,4'-diamino-3,3'-dimethyl diphenyl phosphinic acid, 3,4'-diamino-5-methyl diphenyl phosphinic acid, 3,4'-diamino-2'-methyl diphenyl phosphinic acid, 3,4'-diamino-3'-methyl diphenyl phosphinic acid, 3,4'-diamino-5,2'-dimethyl diphenyl phosphinic acid, 3,4'-diamino-5,3'-dimethyl diphenyl phosphinic acid, 3,3'-diamino-5-methyl diphenyl phosphinic acid and 3,3'-diamino-5,5'-dimethyl diphenyl phosphinic acid.

Similarly it is preferred that in the compounds of formula

X, $X_1$, $X_2$ and $X_3$ are all oxygen whereby the compounds are amino or hydroxy substituted diphenyl phosphates.

The guest compound of the clathrate preferably comprises an accelerator or curative compound having an amino group. Imidazole-based and/or imidazoline based curative compounds are particularly suitable.

The guest compound may be selected from at least one compound selected from the group consisting of a compound represented by formula (II) and/or DBCA.

In the formula (II), $R_1$ represents a hydrogen atom, a $C_1$-$C_{10}$ alkyl group, an aryl group, an arylalkyl group, or a cyanoethyl group, and preferably represents a hydrogen atom.

The $C_1$-$C_{10}$ alkyl group is preferably a $C_1$-$C_6$ alkyl group, and optionally has a substituent. Specific examples of the $C_1$-$C_{10}$ alkyl group can include a methyl group, an ethyl group, a n-propyl group, an i-propyl group, a n-butyl group, a s-butyl group, an i-butyl group, a t-butyl group, a n-pentyl group, a n-hexyl group, a nonyl group, an i-nonyl group, and a decyl group.

The aryl group means a monocyclic or polycyclic aryl group. Here, in the case of a polycyclic aryl group, the aryl group also encompasses a partially saturated group in addition to a fully unsaturated group. Examples thereof include a phenyl group, a naphthyl group, an azulenyl group, an indenyl group, an indanyl group, and a tetralinyl group. Among these groups, a $C_6$-$C_{10}$ aryl group is preferred. Further, the aryl group optionally has a substituent.

The arylalkyl group is a group in which the aryl group and the alkyl group are combined with each other. Examples thereof include a benzyl group, a phenethyl group, a 3-phenyl-n-propyl group, a 1-phenyl-n-hexyl group, a naphthalen-1-ylmethyl group, a naphthalen-2-ylethyl group, a 1-naphthalen-2-yl-n-propyl group, and an inden-1-ylmethyl group. Among these groups, a $C_6$-$C_{10}$ aryl/$C_1$-$C_6$ alkyl group are preferred. Further, the arylalkyl group optionally has a substituent.

$R_2$ to $R_4$ each independently represent a hydrogen atom, a nitro group, a halogen atom, a $C_1$-$C_{20}$ alkyl group, a $C_1$-$C_{20}$ alkyl group substituted with a hydroxy group, an aryl group, an arylalkyl group, or a $C_1$-$C_{20}$ acyl group.

Examples of the $C_1$-$C_{20}$ alkyl group include a methyl group, an ethyl group, a n-propyl group, an i-propyl group, a n-butyl group, a s-butyl group, an i-butyl group, a t-butyl group, a n-pentyl group, a n-hexyl group, a nonyl group, an i-nonyl group, a decyl group, a lauryl group, a tridecyl group, a myristyl group, a pentadecyl group, a palmityl group, a heptadecyl group, and a stearyl group. A $C_1$-$C_{10}$alkyl group is preferred.

The aryl group and the arylalkyl group include the same groups as the groups for $R_1$.

The $C_1$-$C_{20}$ acyl group means a group in which a hydrogen atom, an alkyl group, an alkenyl group, an alkynyl group, an aryl group, a heteroaryl group, or the like is combined with a carbonyl group. Examples of the acyl group include a formyl group; alkylcarbonyl groups such as an acetyl group, a propionyl group, a butyroyl group, a pentanoyl group, a hexanoyl group, a heptanoyl group, an octanoyl group, a nonanoyl group, a decanoyl group, a 3-methylnonanoyl group, an 8-methylnonanoyl group, a 3-ethyloctanoyl group, a 3,7-dimethyloctanoyl group, an undecanoyl group, a dodecanoyl group, a tridecanoyl group, a tetradecanoyl group, a pentadecanoyl group, a hexadecanoyl group, a 1-methylpentadecanoyl group, a 14-methylpentadecanoyl group, a 13,13-dimethyltetradecanoyl group, a heptadecanoyl group, a 15-methylhexadecanoyl group, an octadecanoyl group, a 1-methylheptadecanoyl group, a nonadecanoyl group, an eicosanoyl group, and a heneicosanoyl group; alkenylcarbonyl groups such as an acryloyl group, a methacryloyl group, an allylcarbonyl group, and a cinnamoyl group; alkynylcarbonyl groups such as an ethynylcarbonyl group and a propynylcarbonyl group; arylcarbonyl groups such as a benzoyl group, a naphthylcarbonyl group, a biphenylcarbonyl group, and an anthranilcarbonyl group; and heteroarylcarbonyl groups such as a 2-pyridylcarbonyl group and a thienylcarbonyl group. Among these groups, a $C_1$-$C_{20}$ (including a carbonyl group) acyl group is preferred, and a $C_1$-$C_6$ acyl group is particularly preferred.

Specific examples of the imidazole compound represented by formula (II) include imidazole, 2-ethyl-4-methylimidazole, 1-methylimidazole, 2-methylimidazole, 4-methylimidazole, 1-benzyl-2-methylimidazole, 2-heptadecylimidazole, 2-undecylimidazole, 2-phenyl-4-methyl-5-hydroxymethylimidazole, 2-phenylimidazole, 2-phenyl-4-methylimidazole, 1-benzyl-2-phenylimidazole, 1,2-dimethylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, and 2-phenyl-4,5-dihydroxymethylimidazole, and imidazole, 2-ethyl-4-methylimidazole, 1-methylimidazole, 2-methylimidazole, 4-methylimidazole, 1-benzyl-2-methylimidazole, 2-heptadecylimidazole, 2-undecylimidazole, 1,2-dimethylimidazole, 2-phenyl-4-methyl-5-hydroxymethylimidazole, 2-phenylimidazole, or 2-phenyl-4,5-dihydroxymethylimidazole is preferred.

Examples of the imidazoline compound represented by formula (II) include 2-methylimidazoline, 2-phenylimidazoline, 2-undecylimidazoline, 2-heptadecylimidazoline, 2-ethylimidazoline, 2-isopropylimidazoline, 2,4-dimethylimidazoline, and 2-phenyl-4-methylimidazoline, and 2-methylimidazoline or 2-phenylimidazoline is preferred.

With respect to the clathrate of the compound of (i) with the imidazole compound or imidazoline compound and/or DBCA of (ii), the combination thereof is not particularly limited as long as these compounds are within the range as described above.

The preferred clathrate of this invention can be obtained by directly mixing the host compound with the imidazole compound or imidazoline compound and/or DBCA with all components in their liquid (molten) phase, or by mixing these compounds in a solvent.

When a solvent is used, the clathrate can be obtained by adding the host compound and the guest compound to a solvent, followed by subjecting the resulting mixture to heat treatment or heating and reflux treatment with optional stirring to precipitate the clathrate. It is preferred to use organic solvents such as methanol, acetone, and ethyl acetate as a solvent.

When the imidazole compound or imidazoline compound and/or DBCA is a substance having a low boiling point or a substance having high vapour pressure, a target clathrate can be obtained by applying the vapour of these substances to the host compound.

A clathrate consisting of three components or more can also be obtained by allowing two or more guest compounds to react with the host compound. Furthermore, a target clathrate can be obtained by first producing a clathrate of a host compound with a certain compound (ii) and then allowing the resulting clathrate to react with a different compound of (ii) in the manner as described above.

The structure of the clathrate obtained can be verified by thermal analysis (TGA-DSC, Simultaneous Thermogravimetry & Differential Scanning Calorimetry), an infrared absorption spectrum (IR), an X-ray diffraction pattern, a NMR spectrum, or the like, X-ray diffraction being particularly useful. Further, the composition of the clathrate can be verified by thermal analysis, a $^1$H-NMR spectrum, high performance liquid chromatography (HPLC), elementary analysis, or the like.

BRIEF DESCRIPTION OF THE DRAWINGS

The following examples, with reference to the attached Figures, illustrate but in no way limit the invention.

DETAILED DESCRIPTION OF THE INVENTION

Organic Solvent

Organic solvents may be used in the forming of the clathrates. Suitable organic solvents include alcohols such as methanol, ethanol, propanol, and butanol; ethers such as 2-methoxyethanol, ethylene glycol monoethyl ether, ethylene glycol monobutyl ether, diethylene glycol, diethylene glycol monoethyl ether, and diethylene glycol monobutyl ether; ketones such as acetone, methyl ethyl ketone, 2-pentanone, 2-hexanone, methyl isobutyl ketone, isophorone, and cyclohexanone; esters such as methyl acetate, ethyl acetate, propyl acetate, butyl acetate, isobutyl acetate, ethylene glycol monoethyl ether acetate, propylene glycol monomethyl ether acetate, and diethylene glycol monoethyl ether acetate; and aromatics such as toluene and xylene; and any mixture of two or more of the aforesaid solvents.

Curing Agent or Curing Accelerator

When the guest compound is a curing agent, a curing accelerator may be further included, and when the guest compound is a curing accelerator, a curing agent may be further included.

A curing agent which may be contained in addition to the curing agent accelerator is not particularly limited as long as it is a compound which reacts with an epoxy group in an epoxy resin to cure the epoxy resin. Similarly, a curing accelerator which may be contained in addition to the curing agent is not particularly limited as long as it is a compound which accelerates the above curing reaction. Any one of conventional curing agents or curing accelerators of epoxy resins can be selected and used as such a curing agent or a curing accelerator, respectively. Examples thereof include amine-based compounds such as aliphatic amines, alicyclic and heterocyclic amines, aromatic amines, and modified amines, imidazole-based compounds, imidazoline-based compounds, amide-based compounds, ester-based compounds, phenol-based compounds, alcohol-based compounds, thiol-based compounds, ether-based compounds, thioether-based compounds, urea-based compounds, thiourea-based compounds, Lewis acid-based compounds, phosphorus-based compounds, acid anhydride-based compounds, onium salt-based compounds, and active silica compound-aluminium complexes.

Specific examples of the curing agent or the curing accelerator include the following compounds.

Examples of the aliphatic amines include ethylenediamine, trimethylenediamine, triethylenediamine, tetramethylenediamine, hexamethylenediamine, diethylenetriamine, triethylenetetramine, tetraethylenepentamine, dipropylenediamine, dimethylaminopropylamine, diethylaminopropylamine, trimethylhexamethylenediamine, pentanediamine, bis(2-dimethylaminoethyl)ether, pentamethyldiethylenetriamine, alkyl-t-monoamine, 1,4-diazabicyclo(2,2,2)octane(triethylenediamine), N,N,N',N'-tetramethylhexamethylenediamine, N,N,N',N'-tetramethylpropylenediamine, N,N,N',N'-tetramethylethylenediamine, N,N-dimethylcyclohexylamine, dibutylaminopropylamine, dimethylaminoethoxyethoxyethanol, triethanolamine, and dimethylaminohexanol.

Examples of the alicyclic and heterocyclic amines include piperidine, piperazine, menthanediamine, isophoronediamine, methylmorpholine, ethylmorpholine, N,N',N''-tris(dimethylaminopropyl)hexahydro-s-triazine, 3,9-bis(3-aminopropyl)-2,4,8,10-tetraoxyspiro(5,5)undecane adduct, N-aminoethylpiperazine, trimethylaminoethylpiperazine, bis(4-aminocyclohexyl)methane, N,N'-dimethylpiperazine, and 1,8-diazabicyclo[4.5.0]undecec-7ene and 1,5 diazabicyclo(4.3.0) non-5-ene.

Examples of the aromatic amines include o-phenylenediamine, m-phenylenediamine, p-phenylenediamine, diaminodiphenylmethane, diaminodiphenyl sulfone, benzylmethylamine, dimethylbenzylamine, m-xylenediamine, pyridine, picoline, and α-methylbenzylmethylamine.

Examples of the modified amines include epoxy compound-added polyamine, Michael-added polyamine, Mannich-added polyamine, thiourea-added polyamine, ketone-blocked polyamine, dicyandiamide, guanidine, organic acid hydrazide, diaminomaleonitrile, amine imide, a boron trifluoride-piperidine complex, and a boron trifluoride-monoethylamine complex.

Examples of the imidazole-based compounds include imidazole, 1-methylimidazole, 2-methylimidazole, 3-methylimidazole, 4-methylimidazole, 5-methylimidazole, 1-ethylimidazole, 2-ethylimidazole, 3-ethylimidazole, 4-ethylimidazole, 5-ethylimidazole, 1-n-propylimidazole, 2-n-propylimidazole, 1-isopropylimidazole, 2-isopropylimidazole, 1-n-butylimidazole, 2-n-butylimidazole, 1-isobutylimidazole, 2-isobutylimidazole, 2-undecyl-1H-imidazole, 2-heptadecyl-1H-imidazole, 1,2-dimethylimidazole, 1,3-dimethylimidazole, 2,4-dimethylimidazole, 2-ethyl-4-methylimidazole, 1-phenylimidazole, 2-phenyl-1H-imidazole, 4-methyl-2-phenyl-1H-imidazole, 2-phenyl-4-methylimidazole, 1-benzyl-2-methylimidazole, 1-benzyl-2-phenylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 2-phenylimidazole-isocyanuric acid adduct, 2-methylimidazole-isocyanuric acid adduct, 2-phenyl-4,5-dihydroxymethylimidazole, 2-phenyl-4-methyl-5-hydroxymethylimidazole, 1-cyanoethyl-2-phenyl-4,5-di(2-cyanoethoxy)methylimidazole, 1-dodecyl-2-methyl-3-benzylimidazolium chloride, and 1-benzyl-2-phenylimidazole hydrochloride.

Examples of the imidazoline-based compounds include 2-methylimidazoline and 2-phenylimidazoline.

Examples of the amide-based compounds include a polyamide obtained by condensation of a dimer acid with a polyamine.

Examples of the ester-based compounds include active carbonyl compounds such as an aryl ester and a thioaryl ester of a carboxylic acid.

Examples of the phenol-based compounds, alcohol-based compounds, thiol-based compounds, ether-based compounds, and thioether-based compounds include, as a phenolic resin curing agent, aralkyl type phenolic resins such as a phenol aralkyl resin and a naphthol aralkyl resin, novolac type phenolic resins such as a phenolic novolac resin and a cresol novolac resin, modified resin thereof such as epoxidized or butylated novolac type phenolic resins, dicyclopentadiene-modified phenolic resins, paraxylene-modified phenolic resins, triphenol alkane type phenolic resins, and polyfunctional phenolic resins. Further examples include polyols, polymercaptans, polysulfides, 2-(dimethylaminomethylphenol), 2,4,6-tris(dimethylaminomethyl)phenol, and tri-2-ethylhexyl hydrochloride of 2,4,6-tris(dimethylaminomethyl)phenol.

Examples of the urea-based compounds, thiourea-based compounds, Lewis acid-based compounds include a butylated urea, a butylated melamine, a butylated thiourea, and boron trifluoride.

Examples of the phosphorus-based compounds include organic phosphine compounds, including primary phosphines such as alkylphosphines such as ethylphosphine and butyl phosphine, and phenylphosphine; secondary phosphines such as dialkyl phosphines such as dimethylphosphine and dipropylphosphine, diphenylphosphine, and methylethylphosphine; and tertiary phosphines such as trimethylphosphine, triethylphosphine, and triphenylphosphine.

Examples of the acid anhydride compounds include phthalic anhydride, tetrahydrophthalic anhydride, hexahydrophthalic anhydride, methyltetrahydrophthalic anhydride, methylhexahydrophthalic anhydride, endomethylenetetrahydrophthalic anhydride, methylendomethylenetetrahydrophthalic anhydride, maleic anhydride, tetramethylenemaleic anhydride, trimellitic anhydride, chlorendic anhydride, pyromellitic anhydride, dodecenylsuccinic anhydride, benzophenone tetracarboxylic acid anhydride, ethyleneglycol bis(anhydrotrimellitate), glycerol tris(anhydrotrimellitate), methylcyclohexene tetracarboxylic acid anhydride, and polyazelaic acid anhydride.

Examples of the onium salt-based compounds and active silica compound-aluminum complexes include aryldiazonium salt, diaryliodonium salt, triarylsulfonium salt, a triphenylsilanol-aluminum complex, a triphenylmethoxysilane-aluminum complex, a silyl peroxide-aluminum complex, and a triphenylsilanol-tris(salicylaldehydato)aluminum complex.

Particularly, amine-based compounds, imidazole-based compounds, and phenol-based compounds are preferably used as the curing agent or the curing accelerator. Among the phenol-based compounds, a phenolic resin curing agent is more preferably used.

Prepreg Matrix Composition

In a further embodiment a moulding material is provided comprising a reinforcement material and a resin composition containing a clathrate composition according to this invention.

The moulding material may be constructed from a cast film which contains the resin composition and which is combined with a fibrous reinforcement layer. Preferably the resin impregnates the fibrous reinforcement which may be accomplished by pressing a layer of resin onto the fibrous material or by infusion of the resin into fibrous material within a mould.

A liquid curable epoxy resin composition of the present invention is particularly useful as a prepreg matrix resin composition comprising epoxy resin component and a clathrate of this invention.

Such a prepreg resin composition is excellent in both storage stability and curing characteristics as a one-component liquid epoxy resin composition. The compositions may be cured to provide a cured product of high Tg, Tg retention and fire retardancy.

In the prepreg resin composition of the present invention, the clathrate component can be used as a curing agent or as a curing accelerator. The guest compound may operate as a curing agent or as a curing accelerator. The guest compound is quickly released from the host component by heating, and if the guest compound is a curing agent, it will undergo a crosslinking reaction with the resin component. If the guest compound is an accelerator, the released curing accelerator acts as a curing catalyst of the curing agent and the resin component thereby forming a cured formulated resin matrix. Since the temperature at which the curing agent or the curing accelerator is released is different depending on:

the type of the guest compound (chemical structure);
the type of host compound (chemical structure); and
the blending ratio of the guest to the host,
solubility in the epoxy resin the conditions for the release from the host compound can be controlled by selecting appropriate host and guest compounds.

In the resin compositions of the present invention, the host compound can also react with the resin after releasing the guest compound, thereby having an effect as a crosslinking agent. For example, the amino or hydroxyl groups on the aromatic rings can react with the resin which can result in the cured resin composition product having improved flexibility and improved impact resistance and adhesion. Additionally the presence of the amino and/or hydroxyl groups can accelerate the cure of the resin once they are released from the bonds with the guest component to accelerate cure so resulting in a further reduction in the time required for completion of the cure of the resin.

When the epoxy resin composition of the present invention is used as a prepreg resin composition, known additives such as fillers, viscosity modifiers, tougheners, pigments, thixotropic agents, and fire retardants, or the like can be optionally mixed into the composition to enhance its mechanical performance and flow behaviour during cure.

A prepreg resin composition of the present invention can be prepared by uniformly mixing the clathrate of the invention, the resin and other additives using a pot mill, a ball mill, a bead mill, a roll mill, a homogenizer, Supermill, Homodisper, a universal mixer, Banbury mixer, a kneader, or the like.

Since the prepreg resin composition of the present invention can be a one-component type and has both high storage stability and excellent thermosetting properties, it can be suitably used for applications which require long term storage or storage in unconditioned facilities at room temperature.

The invention is illustrated by reference to the following Examples in which the structures of the compounds produced were verified by proton NMR.

EXAMPLE 1

5.0 g of bis(3-aminophenyl)phosphinic acid (BAPPA) was stirred in 50 ml of refluxing methanol. To the suspension was added 2.2 g of 2-ethyl-4-methyl imidazole (2E4MZ). The solution was refluxed for 3 hours before allowing to cool room temperature. The solvents were removed by rotary evaporation and 30 ml of acetone was added. The resulting solid was then stirred in refluxing acetone for 1 hour before cooling to room temperature. The precipitate was then collected by filtration and washed with acetone before drying in a vacuum oven at 60° C. overnight to give 5.8 g of a tan powder, the conversion was 80.5%. The ratio of host to guest in the precipitated salt was shown to be approximately 1:1 by $^1$H NMR, which is equal to 30.7 wt. % of imidazole.

The clathrate was

BAPPA-2E4MZ

EXAMPLE 2

5.0 g of bis(3-aminophenyl)phosphinic acid was stirred in 80 ml of refluxing methanol. To the suspension was added 3.3 g of 2-methyl imidazole (2MZ). The solution was then refluxed for 3 hours before allowing to cool to room temperature. The solvents were removed by rotary evaporation and 30 ml of acetone was added. The resulting solid was then stirred in refluxing acetone for 1 hour before cooling to room temperature. The precipitate was then collected by filtration and washed with acetone before drying in a vacuum oven at 60° C. overnight to give 5.7 g of a tan powder, 85.1%. The ratio of host to guest in the precipitated salt was shown to be approximately 1:1 by 1H NMR, which is equal to 24.9 wt. % of imidazole.

The clathrate was

BAPPA-2MZ

COMPARATIVE EXAMPLE 1

5.0 g of diphenylphosphinic acid (DPPA) was stirred in 30 ml of refluxing methanol. To the suspension was added 2.5 g of 2E4MZ. The solution was refluxed for 3 hours before allowing to cool to room temperature. The resulting precipitate was collected by filtration, washed with acetone before drying in a vacuum oven at 60° C. overnight to give 5.7 g of a white powder, 76.0%. The ratio of host to guest in the precipitated salt was shown to be approximately 1:1 by 1H NMR, which is equal to 33.5 wt. % of imidazole.

The clathrate was

DPPA-2E4MZ

COMPARATIVE EXAMPLE 2

5.0 g of diphenylphosphinic acid was stirred in 30 ml of refluxing methanol. To the suspension was added 1.8 g of 2MZ. The solution was then refluxed for 3 hours before allowing to cool to room temperature. The resulting precipitate was collected by filtration, washed with acetone before drying in a vacuum oven at 60° C. overnight to give 6.5 g of a white powder, 95.6%. The ratio of host to guest in the precipitated salt was shown to be approximately 1:1 by 1H NMR, which is equal to 27.3 wt. % of imidazole.

The clathrate was

DPPA-2MZ

Figure 1:
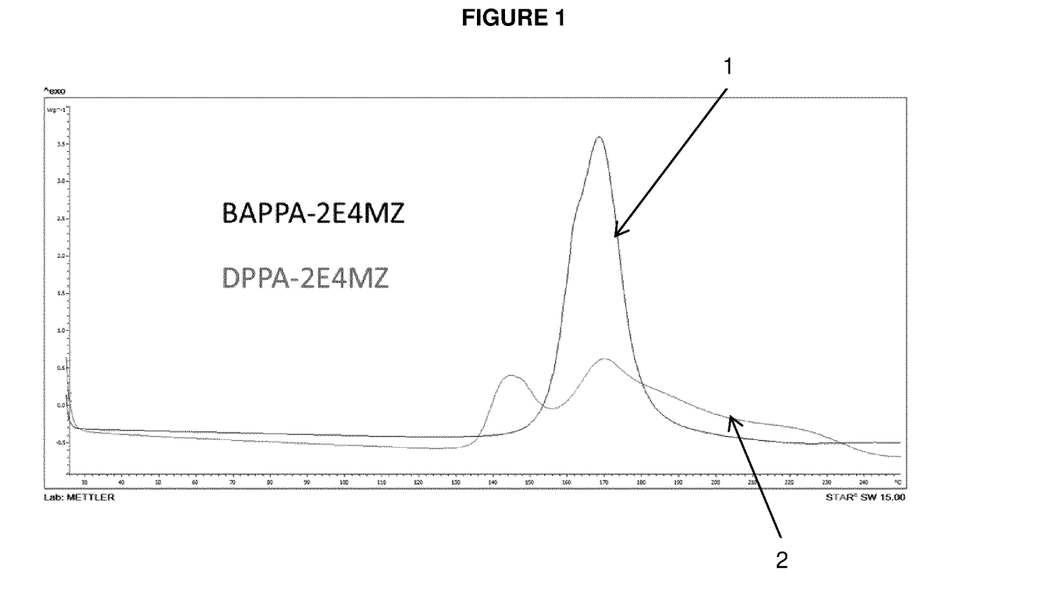
FIG. 1 shows the DSC traces of the compounds containing the clathrate of Example 1 and compatative Example 1.

The products were dispersed in to a bis phenol A epoxy resin to provide 5 wt. % of the imidazole and evaluated by DSC. FIG. 1 hereto is the DSC traces of the compounds containing the clathrate of Example 1 and comparative Example 1 from which it can be seen that the composition containing BAPPA-2E4MZ gave a single exotherm (curve 1), unlike the composition containing DPPA-2E4MZ, which had two peaks (curve 2), an initial exotherm with a lower onset than BAPPA-2E4MZ but a broad second peak with an endset higher than BAPPA-2E4MZ. This was also the case for a similar composition containing the products of Example 2 and comparative Example 2 as shown in Table 1 below.

TABLE 1

| Clathrate | Onset (° C.) | Peak (° C.) | Peak 2 (° C.) | Enthalpy (J/g) | Endset (° C.) |
|---|---|---|---|---|---|
| DPPA-2E4MZ | 135 | 144 | 170 | 373 | 225 |
| DPPA-2MZ | 124 | 138 | 161 | 374 | 240 |
| BAPPA-2E4MZ | 156 | 169 | n/a | 429 | 185 |
| BAPPA-2MZ | 159 | 167 | n/a | 376 | 175 |

The mixtures containing the BAPPA based curatives were cured in a fan oven at 120° C. for 1 hour with 1° C./min ramp rate. However, due to the broad nature of the mixtures containing the DPPA based curatives, they had to be cured at 150° C. for 1 hour to achieve greater than 90% cure. Tg of the cured plaque was determined by DMA. DMA analysis showed the plaques cured with the BAPPA-imidazole curatives had a Tg of between 17-20° C. higher than the DPPA-imidazole counterparts.

The Tg's of the materials were as set out below.

| Clathrate | E' Tg (° C.) |
|---|---|
| DPPA-2E4MZ | 128 |
| DPPA-2MZ | 131 |
| BAPPA-2E4MZ | 148 |
| BAPPA-2MZ | 148 |

Figure 2:
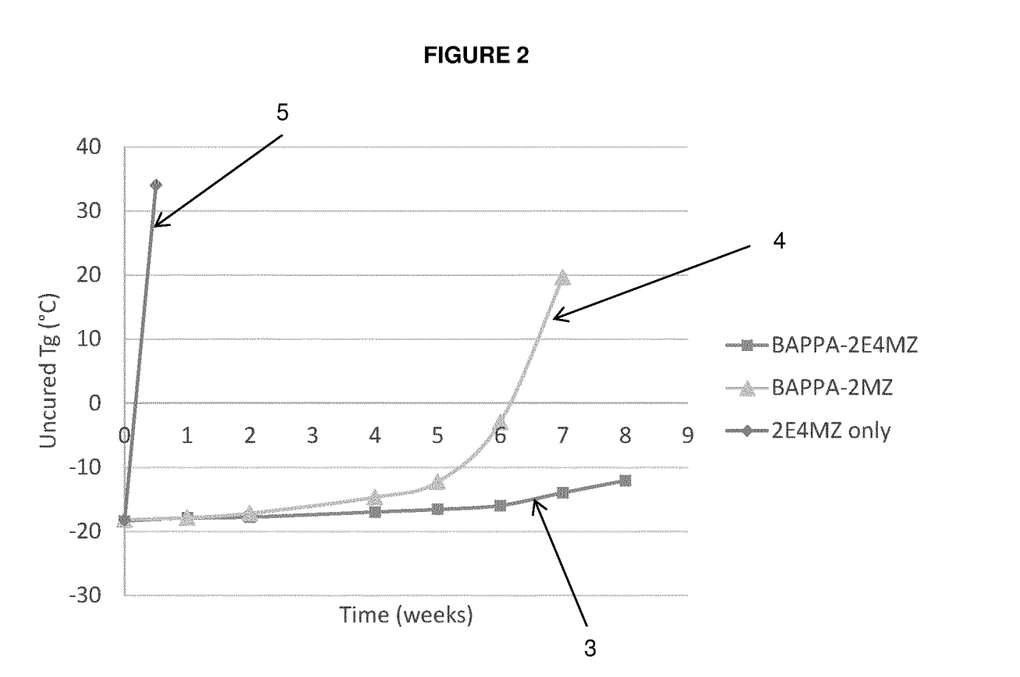
FIG. 2 is a graph showing the outline of two of the inventive compositions (BAPPA-2MZ AND BAPPA-2E4MZ) relative to the outlife of prior art (2E4MZ).

The outlifes of the compositions containing the BAPPA based materials were tracked by monitoring the uncured Tg of the mixtures over time and compared to the outlife of a similar composition containing 2E4MZ alone. The graph which is FIG. 2 hereto shows outlifes of greater than 5 weeks for the BAPPA-2E4MZ composition (curve 3) and the BAPPA-2MZ composition (curve 4) showing the curatives to be considerable latent compared to the composition containing 2E4MZ alone (cure 5), which solidified after a couple of days at room temperature.

The invention claimed is:

1. A clathrate comprising a host compound and a guest compound in which the host compound is selected from compounds of general formula wherein X, $X_1$, $X_2$ and $X_3$ are independently selected from S or O and at least one of $Y_1$ and $Y_2$ is present; and wherein when both $Y_1$ and $Y_2$ are present they may be the same or different and are selected from NHR or OH where R is selected from H or a hydrocarbyl group, and wherein;

the guest compound comprises at least one compound selected from the group consisting of (II)

in which $R_1$ represents a hydrogen atom, a $C_1$-$C_{10}$ alkyl group, an aryl group, an arylalkyl group, or a cyanoethyl group, and $R_2$ to $R_4$ each independently represent a hydrogen atom, a nitro group, a halogen atom, a $C_1$-$C_{20}$ alkyl group, a $C_1$-$C_{20}$ alkyl group substituted with a hydroxy group, an aryl group, an arylalkyl group, or a $C_1$-$C_{20}$ acyl group, and wherein;

the mol ratio of the host compound to the guest compound is from 0.95 to 1.4, and wherein;

the average particle size $D_{50}$ of the clathrate as measured by laser diffraction (ASTM D4464) is, in the range of from 5 to 40 μm, and wherein; and the guest component of the clathrate comprises an accelerator or curative compound having an amino group.

2. The clathrate according to a claim 1 wherein the host compound is of the formula wherein both X and $X_1$ are oxygen.

3. The clathrate according to claim 1 wherein the host compound is of the formula wherein X, $X_1$, $X_2$ and $X_3$ are all oxygen.

4. The clathrate according to claim 3 wherein $Y_1$ and $Y_2$ are amino groups.

* * * * *